May 21, 1929. H. S. HELE-SHAW ET AL Re. 17,298
ROTARY AIR COMPRESSOR
Original Filed Feb. 13, 1925 3 Sheets-Sheet 1
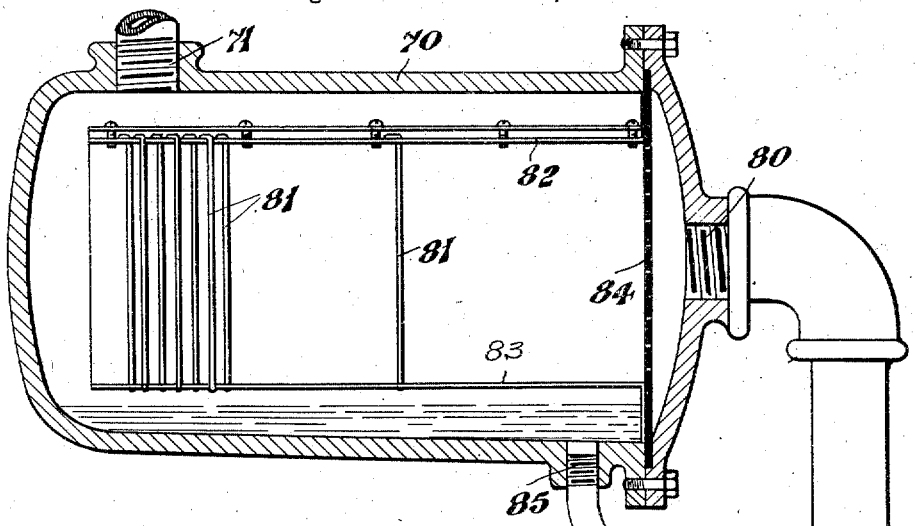
Fig. 1.
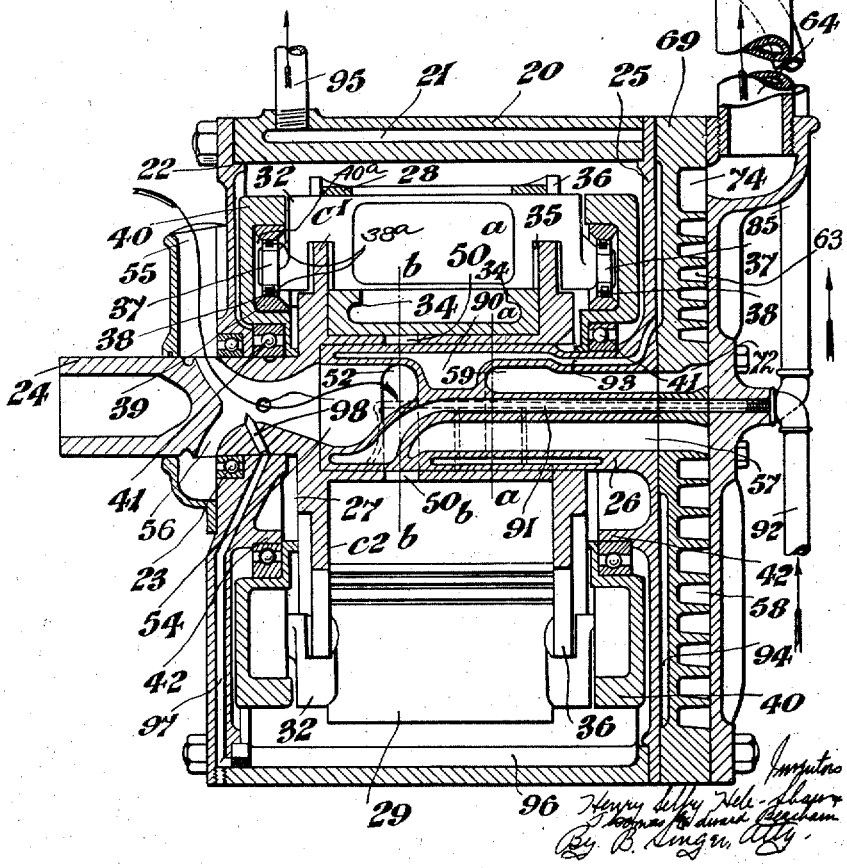
Inventors
Henry Selby Hele-Shaw
Thomas Adams Beacham
By B. Singer, Atty.

May 21, 1929. H. S. HELE-SHAW ET AL Re. 17,298

ROTARY AIR COMPRESSOR

Original Filed Feb. 13, 1925 3 Sheets-Sheet 2

Inventors
Henry Selby Hele-Shaw and
Thomas Edward Beacham
By R. Singer, Atty.

May 21, 1929. H. S. HELE-SHAW ET AL Re. 17,298

ROTARY AIR COMPRESSOR

Original Filed Feb. 13, 1925 3 Sheets-Sheet 3

Inventors
Henry Selby Hele-Shaw
Thomas Howard Beacham
By
B. Singer, Atty.

Reissued May 21, 1929. Re. 17,298

UNITED STATES PATENT OFFICE.

HENRY SELBY HELE-SHAW AND THOMAS EDWARD BEACHAM, OF LONDON, ENGLAND.

ROTARY AIR COMPRESSOR.

Original No. 1,611,030, dated December 14, 1926, Serial No. 8,948, filed February 13, 1925, and in Great Britain March 28, 1924. Application for reissue filed December 6, 1928. Serial No. 324,260.

This invention relates to rotary air compressors having radial cylinders and has for its object to provide improvements in such pumps whereby the efficient working and lubrication thereof are ensured.

The present invention comprises a gas or vapour compressor having a cylinder carrier and a cylindrical valve rotating relatively to one another, wherein the joint between the cylinder carrier and the valve is sealed by a lubricant.

A further feature of the invention comprises a separator or eliminator for separating oil or other lubricant from air or gas consisting of a series of vertical rods arranged in a receptacle into which or through which the air or gas is passed the vertical rods being arranged to cause the stream of air or gas to take a sinuous path and so intercept and collect therefrom the oil and allow it to drain down the rods to the bottom of the separator.

It is proposed to create a film of liquid between the working surfaces in order to prevent gas leakage, in the following manner. A reservoir of oil, glycerine or other liquid is formed in a suitable position which reservoir is under the final gas pressure, a passage being led from this store of liquid to passages in the central valve communicating with suitably arranged holes or grooves in its surface. The pressure in the reservoir will then force the liquid along the central valve and into the valve ports and cylinders and thus maintain a liquid seal. Any liquid which passes the pistons or the end of the valve drains to the bottom of the case from which it is picked up by the air suction, carried through the compressor and up into the reservoir mentioned above. The oil may be picked up by suction by forming a choke tube in the suction inlet of the pump capable of creating sufficient vacuum by Venturi action to lift the oil the required amount, a sprayer being provided if necessary.

Suitable baffles of air filters may be arranged in the top reservoir to enable the discharge gas to deposit the liquid it has carried through the compressors. The case, intermediate and final receivers may be cooled by means of suitable water jackets or by air fins.

An embodiment of the invention is illustrated by the accompanying drawings, wherein—

Figure 1 is a sectional elevation through the pump and separator,

Figure 2 a transverse sectional view through the cylinders and valve at the high pressure cylinders through *a—a*.

Figure 3:
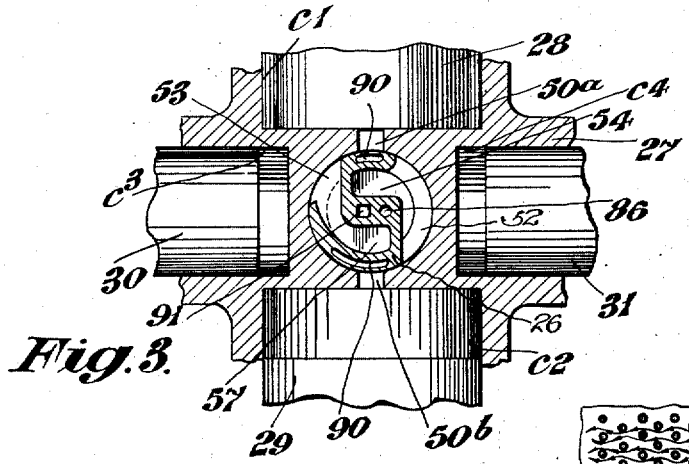
Figure 3 is a sectional view through the valve at the low pressure cylinders through *b—b*.

In these drawings 20 is the main cylindrical portion of the compressor casing having water cooling passages 21. On one end of the casing 20 is bolted an end plate 22 having at its central portion a hole provided with a ball bearing 23 in which rotates a power shaft 24, driven from any suitable source of power. At the other end of the casing is fixed a plate 25 provided with a central cylindrical extension 26 forming a fixed valve fitting in a bore in a cylinder carrier 27 which is formed as an extension of the power shaft 24.

The cylinder carrier 27 is bored at two diametrically opposite places to form low pressure cylinders $C^1$ and $C^2$ in which reciprocate pistons 28 and 29, and at right angles to these low pressure cylinders the carrier is bored at two diametrically opposite places to form high pressure cylinders $C^3$ and $C^4$ in which reciprocate pistons 30 and 31.

Each piston is provided with a gudgeon pin 32, of considerable size compared with the piston and fits in holes in bosses 34 provided in the sides of the pistons which are of the truncated type. At each end of the gudgeon pins 32 a groove 35 is cut away on its inner side in such manner as to leave upper portions adapted to slide in slots 36 provided in opposite sides of the cylinders. The portions of the gudgeon pins projecting beyond the sides of the cylinders are provided with cranked or eccentric pins 37 each of which is provided with roller bearings 38 having an outer circular race $38^a$ on which is mounted the large annular roller 39. This roller 39 rolls in the groove $40^a$ in the ring 40 on that side of the cylinder. The diameter of the annular roller 39 is obviously just a little smaller than the width of the groove $40^a$.

The rings 40, one at each end of the gudgeon pin 22 may be divided and the rollers substituted by slides, slippers or equivalent devices.

The rings 40 are recessed to receive the outer races of ball bearings 41, the inner races of these ball bearings being mounted on eccentric projections 42 extending from the inner faces of the end plates 22 and 25.

By this construction as the power shaft 24 rotates it carries round the cylinder carrier 27 and also the pistons and gudgeon pins 32 and their rollers 39 round in the grooves in the rings 40, and as these rings are mounted on the fixed eccentrics 42 the pistons are reciprocated radially in regular sequence.

The low pressure cylinders $C^1$ and $C^2$ are provided with ports $50^a$ and $50^b$ in their inner ends, and the high pressure cylinders with similar ports $51^a$, $51^b$ each opening on to the outer surface of the fixed central valve 26, the ports $50^a$ and $50^b$ being out of circumferential alignment with the ports $51^a$ and $51^b$.

Figure 6:
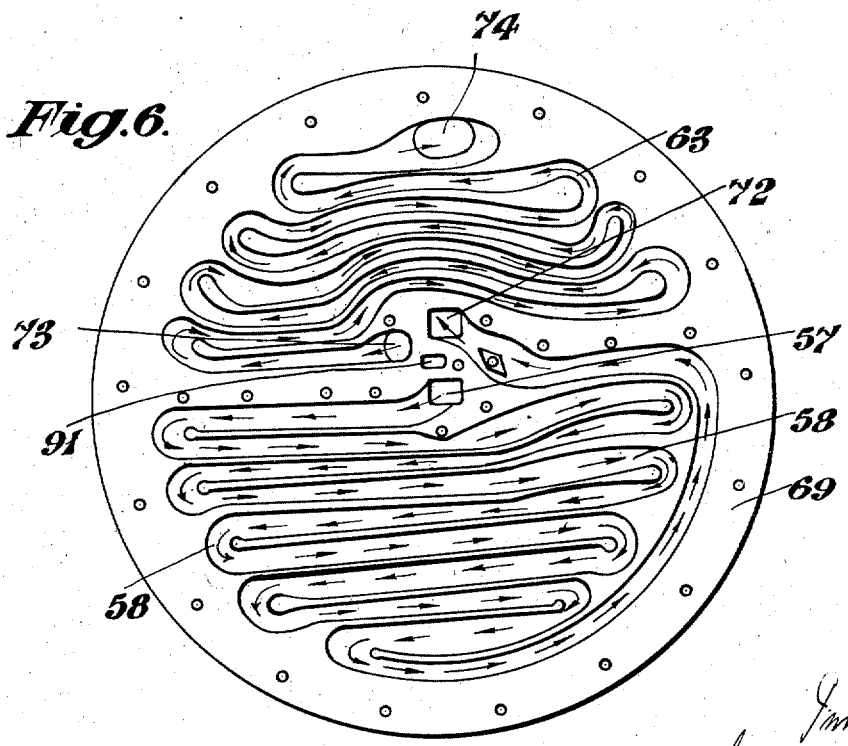
Figure 6 is a view of one end of the compressor casing showing the air cooling passages.

The ports $50^a$ and $50^b$ of the low pressure cylinders rotate over ports 52 and 53 arranged at opposite sides of the valve 26 (see Fig. 3) 52 being connected by a passage 54 in the valve and a passage 56 in the shaft 24 to an air inlet 55, while 53 is connected by a longitudinal passage 57 to a sinuous cooling passage 58 in a plate 69 fixed on the end plate 25 of the casing 20 (see Fig. 6).

The ports $51^a$ and $51^b$ of the high pressure cylinder rotate over ports 60 and 61 arranged at opposite sides of the valve 26 (see Fig. 2) 60 being connected by a longitudinal passage 59 with an opening in the plate 25 registering with a port 72 in the plate 69 at the other end of the cooling passage 58, while the valve port 61 is connected by a longitudinal passage 62 and an inlet 73 to a final sinuous cooling passage 63 in the plate 69, the outlet 74 of this passage being connected to a pipe 64 leading to a separator 70 in which the oil is separated from the air before it passes through an outlet 71 into a compressed air reservoir or to any desired motor or apparatus for direct use.

The low pressure cylinders $C^1$, $C^2$, are coaxial at opposite sides of the valve 26 so that when the port $50^a$ of the cylinder $C^1$ is open through the valve port 52 to the air inlet 55, the port $50^b$ of the cylinder $C^2$ will be open through the valve port 53 to the cooler 58, and the high pressure cylinders $C^3$ and $C^4$ are at right angles to $C^1$ and $C^2$ and also coaxial at opposite sides of the valve 26 so that when the port $51^a$ of the cylinder $C^3$ is open through the valve port 60 to the cooler 58, the port $51^b$ of the cylinder $C^4$ will be open through the valve port 61 to the final cooler 63.

Air or gas passes through the inlet 55, the passage 56 in the shaft 24, and the passage 54 in the valve 26 and then through the valve port 52, and when in register therewith, through the port $50^a$ into the cylinder $C^1$ during the outstroke of the piston 28. The continued rotation of the cylinders around the valve 26 closes the valve port 52 and opens the valve port 53 to the cylinder $C^1$ so that during the instroke of the piston 28 air is compressed and passes through the port 53 and along the longitudinal valve passage 57 into the cooling passage 58 in the end plate 69. The outlet of the cooling passage 58 terminates in an opening 72 in the plate 69 which is in register with a longitudinal valve passage 59 and during the outstroke of the piston 31 the passage 58 is in communication with the high pressure cylinder $C^4$ through the valve port 60 and cylinder port $51^b$ (see Figs. 1 and 2), and during the instroke of the piston 31 of the high pressure cylinder $C^4$ the cylinder carrier 27 rotates to such a position that the cylinder port $51^b$ will register with the valve port 61 which opens into a valve passage 62 of which the other end is in register with the second cooling passage 63 in the plate 69.

Figure 4:
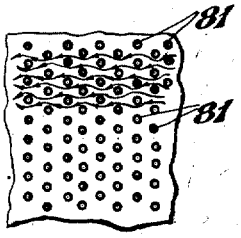
Figure 4 is a plan view of a portion of the oil collector or separator illustrating the path of the air.

The eliminator or separator 70 consists of a horizontal cylindrical vessel having an inlet 80 connected to the compressed air delivery pipe 64 and contains a series of vertical rods 81 supported between two horizontal plates 82 and 83, a perforated distributing plate 84 being fixed in the cylinder over the inlet 80 so that all the air will pass through this plate before passing between the rods. The rods 81 are arranged in rows as shown in Figure 4, each row being opposite the spaces of the next row so that air passing through these rods will take a sinuous path as shown by the arrows.

The air passing through the eliminator encounters the rods and deposits the suspended oil on the rods, this oil drains down the rods into the space below them, while the clean air passes through the outlet 71. These vertical rods 81 must be sufficiently close together to insure all the oil from the passing air collected on them, they must however, also be sufficiently far apart to prevent the collected oil being taken up by the passing air, that is their dimensions, number and disposition must be such as to prevent the air passing between them at a velocity that will not be high enough to effect a scouring of the rods, or too low and so pass round the rods without depositing the oil.

Figure 2:
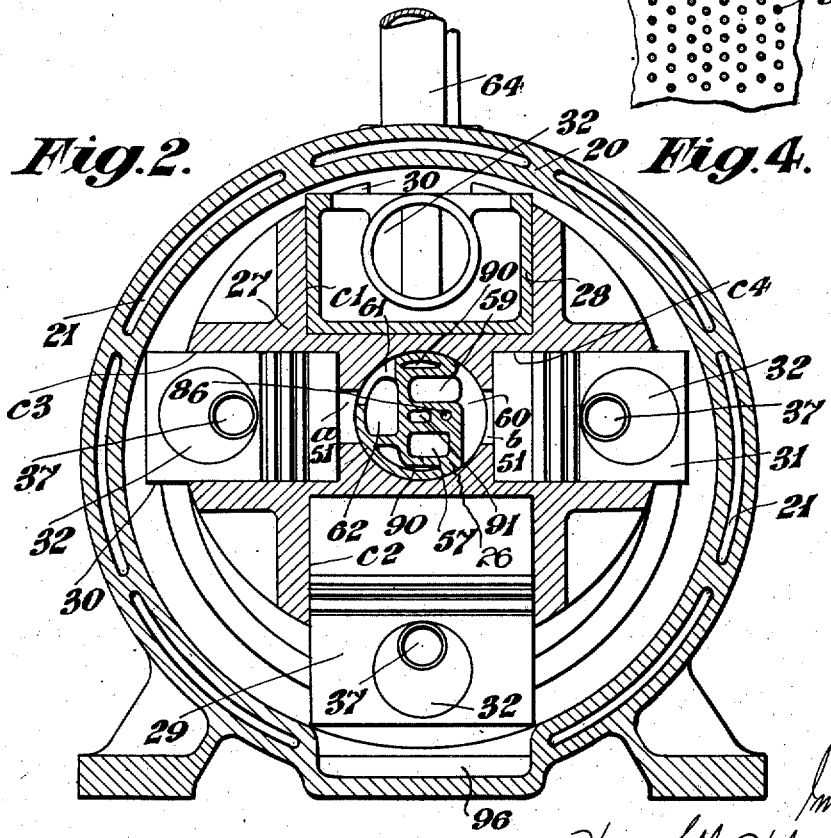
Figure 5:
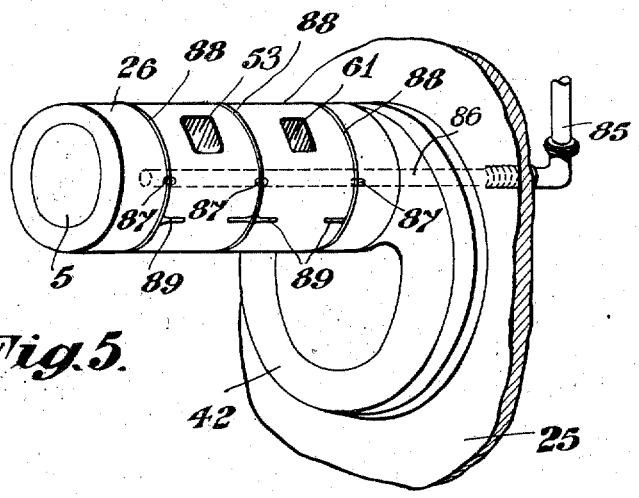
Figure 5 is a perspective view of the valve.

The oil from the separator 70 passes down through a pipe 85 to a longitudinal passage 86 in the valve 26 (see Figs. 2 and 5). The passage 86 branches off through radial holes 87 to circumferential grooves 88 provided on the valve surface, each of these surface grooves 88 being provided with branches 89 leading to the line of ports to ensure the formation of a complete oil film round the valve 26.

The valve 26 is provided with circulating cooling water spaces 90 communicating by a passage 91 with a water supply pipe 92, and also with an outlet passage 93 which conducts the water to a space 94 between the end plate 25 and the cooler plate 69. The water then passes through passages not shown to the water jackets 21 of the casing and is discharged through the outlet pipe 95.

The oil collected by the rods 81 drains to the bottom of the casing 20 in a well 96, which communicates by a passage 97 in the end plate 22 with radial openings 98 in the shaft 24 and which open into the air passage 56 so that during the rotation of the shaft oil will be drawn into this passage carried with the air into the cylinders and thereby lubricate the pistons. In cases where it is desired to compress a gas from or to a pressure which may vary considerably, nonreturn valves may be arranged between any of the intermediate and final receivers, so that in the event of the final pressure being reached in an intermediate cylinder the latter is enabled to discharge direct into the high pressure passage.

The case may be in communication with either suction, discharge or an intermediate pressure, and the shaft passing through the case fitted with a gland which gland may be fed with oil from the pressure reservoir to form a liquid seal at this point.

The cylinders instead of being arranged in diametrically opposite pairs as shown in the drawings may be arranged at any suitable angle to one another.

What we claim and desire to secure by Letters Patent is:—

1. A rotary air or gas compressor, comprising high and low pressure cylinders, a rotary cylinder-carrier, a fixed cylindrical valve having inlet and outlet passages, and a gas cooler, the cylinder carrier being provided with passages leading from the cylinders to the valve about which it rotates to place the outlet from a low pressure cylinder in communication with the cooler and then the cooler in communication with the inlet of a high-pressure cylinder, and then the outlet of the high-pressure cylinder in communication with the compressed air delivery outlet.

2. A rotary air or gas compressor, comprising high and low pressure radial cylinders, a rotary cylinder carrier, a fixed cylindrical valve having ports and inlet and outlet passages connected thereto; and a gas cooler, the outer ends of the cylinders being open and their inner ends provided with passages leading to a bearing face of the cylinder carrier on the valve, the cylinder carrier rotating on the valve to place the low pressure cylinder in communication with the cooler and then the cooler in communication with the high pressure cylinder, and then the high pressure cylinder in communication with the compressed air delivery outlet.

3. A rotary air or gas compressor, comprising a plurality of high and low pressure cylinders, a rotary cylinder carrier, a fixed cylindrical valve having inlet and outlet passages connected thereto, and a gas cooler, the cylinders being arranged in diametrically opposed high pressure and low pressure pairs in the carrier and the carrier provided with passages leading from the cylinders to oppositely disposed ports in the valves about which it rotates to place first one low pressure cylinder in communication with the coolers and then the cooler in communication with the high pressure cylinder, and then the high pressure cylinder in communication with the compressed air delivery outlet and during the same sequence of operations to place the opposite low pressure cylinder in communication with the air supply and the opposite high-pressure cylinder in communication with the corresponding low pressure cylinder.

4. A rotary air and gas compressor, comprising high and low pressure cylinders, a rotary cylinder carrier, a fixed cylindrical valve having inlet and outlet passages connected thereto, and two gas coolers, the cylinder carrier being provided with passages leading from the cylinders to the valve about which it rotates to place the low pressure cylinder in communication with one of the coolers and then this cooler in communication with the high pressure cylinder, and then the high pressure cylinder in communication with the other cooler and from which the compressed air is delivered.

5. A rotary air or gas compressor, comprising high and low pressure radial cylinders, a rotary cylinder carrier a fixed cylindrical valve having ports and inlet and outlet passages connected thereto, and two gas coolers, the outer ends of the cylinders being open and their inner ends provided with passages leading to a bearing face of the cylinder carrier on the valve, the cylinder carrier rotating on the valve to place the low pressure cylinder in communication with one of the coolers and then to place this cooler in communication with the high pressure cylinder and then the high pressure cylinder in communication with the second cooler from which the compressed air is delivered.

6. A rotary air or gas compressor, comprising a plurality of high and low-pressure cylinders, a rotary cylinder carrier, a fixed cylindrical valve having inlet and outlet passages connected thereto, and two gas coolers, the cylinders being arranged in diametrically opposed high pressure and low pressure pairs in the carrier and the carrier provided with passages leading from the cylinders to oppositely disposed ports in the valve about which it rotates to place first one low pressure cylinder in communication with one of the coolers and then to place this cooler in communication with the high pressure cylinders, and then the high pressure cylinder in communication with the second cooler from which the compressed air is delivered, and during the same sequence of operations to place the opposite low pressure cylinder in communication with the air supply and the opposite high pressure cylinder in communication with the corresponding low pressure cylinder.

7. A rotary air or gas compressor, comprising a casing having cooling water circulating jackets and passages, high and low pressure cylinders a rotary cylinder carrier, a fixed cylindrical valve having inlet and outlet air or gas passages and cooling water circulating passages, and a gas cooler, the cylinder carrier being provided with passages leading from the cylinder to the valve about which it rotates to place the low pressure cylinder in communication with the cooler and the cooler in communication with the high pressure cylinder, and then the high pressure cylinder in communication with the compressed air delivery outlet, the cooling jacket and passages of the casing being permanently in series with those of the valve.

8. A rotary air or gas compressor in accordance with claim 1, having one or more pairs of radial low pressure cylinders disposed co-axially on opposite sides of the valve, and one or more pairs of similarly disposed high pressure cylinders arranged at right angles to the low pressure cylinders on the carrier.

9. A rotary air or gas compressor in accordance with claim 1, wherein the coolers are in the form of sinuous passages in a plate secured to one of the end plates of the casing of the compressor.

10. A rotary air or gas compressor comprising high and low pressure cylinders, a rotary cylinder carrier, a fixed cylindrical valve having inlet and outlet air or gas passages and lubricating passages to annular grooves in its cylindrical surface, a gas cooler and an oil separator, the cylindrical carrier being provided with passages leading from the cylinder to the valve about which it rotates to place the low pressure cylinder in communication with the cooler and the cooler in communication with the high pressure cylinder, and then the high pressure cylinder in communication with the separator, the oil from the separator being forced by the compressed air through the lubricating passages to the annular grooves in the valve face.

11. A rotary air or gas compressor, comprising high and low pressure cylinders, a rotary cylinder carrier, a fixed cylindrical valve having inlet and outlet air or gas passages and lubricating passages to its cylindrical surface, a gas cooler and an oil separator, the cylinder carrier being provided with passages leading from the cylinder to the valve about which it rotates to place the low pressure cylinder in communication with the cooler and the cooler in communication with the high pressure cylinder, then the high pressure cylinder in communication with the separator, the oil from the separator being forced by the compressed air through the lubricating passages of the valve.

12. A rotary air or gas compressor as in claim 1, having a rotating cylinder carrier carrying a number of radial cylinders rotating on a fixed cylindrical valve on which the ports and passages are so arranged that air or gas from each low pressure cylinder is discharged through intermediate receivers into higher pressure cylinders and finally into the separator or discharge pipe.

13. A rotary air or gas compressor comprising a pair of high and low pressure cylinders, reciprocating pistons therein, a rotary cylinder carrier, a fixed cylindrical valve having inlet and outlet passages, two air or gas coolers, an oil separator, and means for reciprocating the pistons in the cylinders, the cylinder carrier being provided with passages leading from the cylinders to the valve about which it rotates to place the low pressure cylinder in communication with one of the coolers and then this cooler in communication with the high pressure cylinder and then the high pressure cylinders in communication with the other cooler from which the compressed air is delivered to the oil separator.

14. A rotary air or gas compressor comprising two pairs of high and low pressure cylinders, reciprocating pistons therein, a rotary cylinder carrier, a fixed cylindrical valve having inlet and outlet passages, two air or gas coolers, an oil separator, and means for reciprocating the pistons in the cylinders, the cylinder carrier being provided with passages leading from the cylinders to the valve about which it rotates to place the low pressure cylinders in communication with one of the coolers and then this cooler in communication with the high pressure cylinders, and then the high pressure cylinders in communication with the other cooler from which the compressed air is delivered to the oil separator.

15. A rotary air or gas compressor comprising a pair of cylinders, reciprocating pistons therein, a rotary cylinder carrier, a fixed cylindrical valve having inlet and outlet passages, an air or gas cooler, an oil separator, and means for reciprocating the pistons in the cylinders, the cylinder carrier being provided with passages leading from the cylinders to the valve about which it rotates to place the cylinders in communication with the cooler from which the compressed air is delivered to the oil separator.

16. A rotary air or gas compressor comprising high and low pressure cylinders, reciprocating pistons therein provided with gudgeon pins whereby they are reciprocated, a rotary cylinder carrier, a pair of fixed eccentrics, a pair of laterally grooved and oppositely disposed rings mounted on said fixed eccentrics, a fixed cylindrical valve having inlet and outlet passages, the cylinders being arranged radially in the carrier with their outer ends open and their inner ends communicating by passages to a bearing face of the carrier running on the fixed valve and registering during the rotation of the carrier with openings in the valve leading to the passages therein and the gudgeon pins provided on the under sides with undercut grooves whereby they extend down the sides of the cylinders and extend laterally into the grooves of the grooved rings.

17. A rotary air or gas compressor comprising a casing having end plates, a rotary cylinder carrier mounted therein, radial high and low pressure cylinders carried by said carrier, reciprocating pistons in said cylinders, means for reciprocating said pistons, a fixed central valve, an air or gas cooler having sinuous passages, the passages in the fixed valve being so arranged that the air or gas from each low pressure cylinder is discharged through the sinuous passages of the cooler into the high pressure cylinder, the sinuous passages being formed in one of the end plates of the casing.

18. A rotary air or gas compressor comprising a rotary cylinder carrier, radial cylinders mounted therein, reciprocating pistons in said cylinders, gudgeon pins carrying rollers mounted on said pistons, a fixed central valve, an air or gas receiver, a pair of fixed eccentrics, a pair of laterally grooved and oppositely disposed rings mounted on said fixed eccentrics, the passages in the valve being so arranged that air or gas from the cylinder is discharged into the receiver, and the gudgeon rollers being arranged to run in the grooves of the grooved rings which rotate freely on the fixed eccentrics thereby reciprocating the pistons.

19. A rotary air or gas compressor comprising a rotary cylinder carrier, radial cylinders provided with passages leading to a bearing face of the carrier mounted on said carrier, pistons in said radial cylinders having laterally extending gudgeon pins provided with rollers, a pair of oppositely disposed and grooved rings of fixed eccentricity, a fixed central valve, the valves having inlet and outlet passages extending to the bearing face of the valve on which rotates the cylinder carrier so that during the rotation of the carrier the passages in the cylinder and valve will register to effect the compression and delivery of the air or gas and the reciprocation of the pistons being effected by the rollers of the gudgeon pins extending into the grooves of the rings of fixed eccentricity.

20. A rotary air motor or compressor comprising radial cylinders, a central valve about which said cylinders rotate, reciprocating pistons in said cylinders, gudgeon pins mounted in said pistons, grooved rings rotatable on fixed eccentrics relative to the central valve into the grooves of which the gudgeon pins extend laterally, said rings being entirely separate from each other, but cooperating in unison with the gudgeon pins to reciprocate the pistons.

In witness whereof we affix our signatures.

HENRY SELBY HELE-SHAW.
THOMAS EDWARD BEACHAM.